US009161282B2

(12) United States Patent
Sfar

(10) Patent No.: US 9,161,282 B2
(45) Date of Patent: Oct. 13, 2015

(54) ENHANCED HANDOVER PROCEDURE

(75) Inventor: Safouane Sfar, Nuremberg (DE)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 13/884,725

(22) PCT Filed: Nov. 14, 2011

(86) PCT No.: PCT/EP2011/070085
§ 371 (c)(1),
(2), (4) Date: Jun. 29, 2013

(87) PCT Pub. No.: WO2012/065959
PCT Pub. Date: May 24, 2012

(65) Prior Publication Data
US 2013/0273917 A1    Oct. 17, 2013

(30) Foreign Application Priority Data
Nov. 15, 2010    (EP) ................................. 10306258

(51) Int. Cl.
*H04W 36/30* (2009.01)
*H04W 36/00* (2009.01)
*H04W 36/22* (2009.01)

(52) U.S. Cl.
CPC .......... *H04W 36/30* (2013.01); *H04W 36/0094* (2013.01); *H04W 36/22* (2013.01)

(58) Field of Classification Search
CPC ............ H04W 36/00; H04W 36/0016; H04W 36/0005; H04W 36/0055; H04W 36/0072; H04W 36/0077; H04W 36/30; H04W 36/36; H04W 36/16; H04W 36/0088; H04W 36/0083; H04W 36/0044; H04W 36/04; H04W 36/0094; H04W 36/22; H04W 4/06; H04B 7/18563; H04B 7/18591; H04J 60/41

USPC .................. 370/236.1, 237; 455/436, 446, 455/435.1–435.3
See application file for complete search history.

(56) References Cited

U.S. PATENT DOCUMENTS 5,422,933 A * 6/1995 Barnett et al. ................ 455/439
2004/0266474 A1 * 12/2004 Petrus .......................... 455/525
(Continued)

FOREIGN PATENT DOCUMENTS

| EP | 1 499 147 A1 | 1/2005 |
|----|--------------|--------|
| EP | 1 677 564 A1 | 7/2006 |

(Continued)

OTHER PUBLICATIONS

Doo-Won Lee, Gye-Tae Gil and Dong-Hoi Kim "A cost-based adaptive handover hysteresis scheme to minimize the handover failure rate in 3gpp LTE System" published in EURASIP Journal of Wireless Communications and Networking on Jul. 20, 2010.*

(Continued)

*Primary Examiner* — Nizar Sivji
(74) *Attorney, Agent, or Firm* — Patent Portfolio Builders PLLC

(57) ABSTRACT

The invention relates to a handover method for redirecting an ongoing communication of a connected cellular device (UE) from a serving cell (SRV_C) to a target cell (TGT_C). Both cells (SRV_C, TGT_C) belong to a network. The method comprises receiving, in the connected cellular device (UE), a cell attenuation measurement, a supplemental hysteresis parameter which value depends on the load of the target cell (TGT_C), and a threshold parameter. The method comprises comparing, in the connected cellular device (UE), an additive combination of the cell attenuation measurement, of a hysteresis parameter and of the supplemental hysteresis parameter with the threshold parameter. The method comprises sending, from the connected cellular device (UE), a measurement report to the network, if the result of the comparison remains positive during a given duration. The invention also relates to a cellular device (UE) and to a computer program implementing the aforementioned method.

11 Claims, 4 Drawing Sheets

| Cell Load | TTT_TGT_Load |
|-----------|--------------|
| 50% | 2560 ms |
| 60% | 5120 ms |
| 70% | 10240 ms |
| 80% | 20480 ms |
| 90% | 40960 ms |
| 100% | 91920 ms |

(56) References Cited

U.S. PATENT DOCUMENTS

| | | |
|---|---|---|
| 2005/0208890 A1* | 9/2005 | Karabinis .................... 455/12.1 |
| 2008/0167041 A1 | 7/2008 | Wang et al. |
| 2009/0181676 A1* | 7/2009 | Lee et al. ...................... 455/436 |
| 2012/0094673 A1* | 4/2012 | Sebire et al. ................. 455/436 |
| 2014/0045500 A1* | 2/2014 | Dimou et al. ................. 455/436 |

FOREIGN PATENT DOCUMENTS

| | | |
|---|---|---|
| EP | 2 048 907 A1 | 4/2009 |
| WO | WO 2009002241 A1 * | 12/2008 .............. H04Q 7/38 |

OTHER PUBLICATIONS

"LTE Evolved UTRA; RRC; 3GPP 36.331 version 9.3.0 release 9" published Jul. 1, 2010.*

International Search Report issued in corresponding International application No. PCT/EP2011/070085, date of mailing Feb. 7, 2012.

"LTE; Evolved Universal Terrestrial Radio Access (E-UTRA); Radio Resource Control (RRC); Protocol Specification (3GPP TS 36.331 version 9.3.0 Release 9)", Technical Specification, European Telecommunications Standards Institute (ETSI), 650, Route Des Lucioles; F-06921 Sophia-Antipolis, France, 3GPP Ran 2, No. V9.3.0, Jul. 1, 2010, XP014047472.

* cited by examiner

| Cell Load | TTTCellLoad |
|---|---|
| 50% | 2560 ms |
| 60% | 5120 ms |
| 70% | 10240 ms |
| 80% | 20480 ms |
| 90% | 40960 ms |
| 100% | 91920 ms |

FIG. 4

ENHANCED HANDOVER PROCEDURE

BACKGROUND

The invention generally relates to devices and methods for handover procedures in cellular networks.

An example of handover (handoff in American English) consists in switching a cellular communication from one cell to another cell during a communication, when the other cell is expected to provide a better service. Some difficulties in this process lie in particular in the determination of the criteria for deciding to trigger a handover, and then in the choice of the next cell to which to connect. For example, if all cellular devices in a given area connect to a single cell offering the best signal and none of the cellular devices connect to the neighboring cells, while the neighboring cells offer a sufficient (albeit lower) signal strength, the best cell is likely to be overloaded and to deliver a poor service, while other cells are available but unused.

A handover can be triggered by a cellular device on the basis of triggers defined by the network. The major triggers are the hysteresis, or "HO hysteresis" (for handover hysteresis), and the "Time To Trigger" (also known as TTT). A handover can be triggered when for example the RSRP value from an adjacent cell is higher than the one from the serving cell by a number of decibels greater than or equal to the parameter "HO hysteresis". This condition has to be satisfied for a duration greater than or equal to TTT.

The cellular device may be configured to send a report to the network when some events occur, for example when the serving cell signal drops below a given threshold. The goal is to trigger an action in the network as soon as the measurement report sent by the cellular device and associated with the event is received by the network. Then the network can select a cell and instruct the cellular device to handover to such selected cell.

This handover mechanism in LTE network is explained in 3GPP TS 36.331, in particular in section 5.5.

Handover should be distinguished from cell reselection. Cell reselection in LTE network is specified in 3GPP TS 36.304. Cell reselection takes place in idle mode, is fully managed by a cellular device, and takes place while the cellular device is not communicating in the user plane. In contrast, handover takes place during a communication, and is based on information supplied by a network to a cellular device. In a handover, a network configures a cellular device to carry out measurements and communicate them to the network, and based on such measurements, the network guides the cellular device for the handover.

In addition there is no "Time To Trigger" in a reselection. Time To Trigger is used to send an event in a network. In a reselection, there is a time duration parameter called Treselection, but after Treselection has elapsed, the cellular device switches directly to the next cell without sending any information to the network (no event is triggered, and no measurement report is sent upon event triggering).

Cell reselection nonetheless comprises mechanisms which understanding can be useful in order to appreciate the invention. In particular, EP2077690A2 deals with elaborate cell reselection procedures, and will be discussed below. The approaches described below are not prior art to the claims in this application and are not admitted to be prior art by inclusion in this section.

According to EP2077690A2, priorities can be used for the purpose of load balancing. For example, a high priority can be set to a frequency or RAT having a low load such that a UE (user equipment, i.e. a cellular device according to LTE) preferentially selects a cell having a low load and receives a service, thereby achieving load balancing between the cells. The load balancing is achieved in the unit of cells, tracking areas, registration areas each including a plurality of tracking areas, or PLMNs, according to the range of the area to which the priority of the frequency or RAT is applied.

EP2077690A2 discloses a number of possibilities for choosing the next cell during cell reselection, two of which are noteworthy and are explained below.

A first possibility according to EP2077690A2 is illustrated on FIG. 1, which shows a method of reselecting a cell according to priority by a UE in idle mode. The priority is defined per frequency or RAT. If the priorities are defined with respect to different frequencies or RATs, the UE selects a cell corresponding to a frequency or RAT having a high priority once the cell satisfies a minimum signal characteristic value (minimum value) or a certain signal characteristic value (threshold value) defined in the system. Exceptionally, the UE may select a cell having a highest signal characteristic value without considering the priority at the time of initial cell selection. If a UE selects a cell having a highest priority and receives the service (S820) and the signal characteristic value of the cell (serving cell) which provides the service is equal to or greater than a certain value (e.g., $S_{nonintrasearch}$), the measurement of a cell having a low priority may not be performed and thus power consumption can be efficiently reduced (S840 and S842). In contrast, if the signal characteristic value of the serving cell is reduced to a certain value or less although the priority of the serving cell is highest, the UE may select another cell having a low priority and that satisfies the certain signal characteristic value by the measurement process (S844 and S846). If a plural number of cells satisfy the certain value, a cell satisfying a certain criterion (e.g., a cell having a highest priority, a cell having a highest signal characteristic value or the like) may be selected from the plural number of cells (S846).

In contrast, if the UE does not select the cell using the frequency and/or RAT having the highest priority so as to receive the service (that is, the cell having a low priority is selected) (S820), although the signal characteristic value of the serving cell is equal to or greater than the certain value (e.g., $S_{nonintrasearch}$), the UE periodically searches for the cell using the frequency and/or RAT having a high priority (S830 and S832). The period for searching for another cell may be jointly decided between the base station and the UE, or may be decided by any one of the base station or the UE and notified to the other node.

The cell reselection process according to a priority can take place as follows. First, when the UE reselects another cell having the same priority as the serving cell, the UE reselects a cell having a highest signal characteristic value by a ranking process of comparing the intensity and quality of the signal. The equation which is used for the ranking process between the cells having the same priority is as follows.

$$R_s = Q_{meas,s} + Q\text{hyst}_s$$

$$R_n = Q_{meas,n} - Q\text{offset}$$

where $Q_{meas,s}$ denotes a reference symbol received power (RSRP) value measured by the UE with respect to the serving cell, $Q_{meas,n}$ denotes a RSRP value measured by the UE with respect to the neighbor cells, $Q\text{hyst}_s$ denotes a hysteresis value for weighting the serving cell, and Qoffset denotes at least one of a bias value between cells and a bias value between different frequencies.

In the ranking process, if the cell having the highest signal characteristic value satisfies a criterion $R_n > R_s$ for a certain time Treselection$_{EUTRAN}$, the UE selects a cell corresponding to $R_n$. That is, a cell having a best signal characteristic is reselected from the cells having the signal characteristic better than that of the serving cell. In the conventional WCDMA, the cell having the highest signal characteristic value is reselected by the above-described ranking process without using the priority information of the frequency or RAT.

A second possibility according to EP2077690A2 is illustrated on FIG. 2 in which a UE receives a service from a serving cell using a frequency 3. The UE performs a cell search in order to perform cell reselection. The cell reselection is performed while the signal characteristic value of the serving cell is reduced to a value of Thresh$_{serving}$ or less (e.g., due to the movement of the UE). Assuming a cell using a frequency 1 and a cell using a frequency 2 exist in the boundary of the serving cell, the UE starts the signal measurement of the two cells. That is, the two cells become candidate cells for cell reselection. In this example, the priority of the frequency 1 is lower than that of the frequency 2. The priority of the frequency of the serving cell may be equal to that of any one of the frequency 1 or the frequency 2, or may be between the priorities of the frequency 1 and the frequency 2.

Both the signal characteristic values of the cell using the frequency 1 and the cell using the frequency 2 are equal to or greater than a certain threshold value Thresh_H/L when the UE starts the signal measurement with respect to the candidate cells. Accordingly, the UE operates a first timer with respect to the cell of the frequency 1 and monitors a time duration for which the signal characteristic value satisfies Thresh_L. In addition, the UE operates a second timer with respect to the cell of the frequency 2 and monitors a time duration for which the signal characteristic value satisfies Thresh_H.

Because the priority of the frequency 1 is lower than that of the frequency 2, the UE sets different expiration times for the first timer and the second timer (i.e., first timer: TreselectionRAT_low, second timer: TreselectionRAT_high). Specifically, the UE sets the expiration time of the first timer for the cell of the low priority to be longer than that of the second timer. If more candidate cells which are selectable by the UE are present, the UE may set the timers of these cells individually or per group in consideration of the priorities of the candidate cells.

If the timers are individually set, the UE sets the expiration time of the timer for each candidate cell according to the priority. Thus, timers become longer for cells having a lower priority.

If the timers are set per group, the UE divides the candidate cells into groups based on the priority of the candidate cell relative to the priority of the serving cell. That is, the candidate cells are divided into a) cells having a priority higher than that of the serving cell, b) cells having a priority equal to that of the serving cell, and c) cells having a priority lower than that of the serving cell. Based on this division, the expiration times of the timers of the candidate cells of the same relative priority may be set to be equal.

Because the first timer and the second timer may be simultaneously started but the expiration time of the second timer is shorter than that of the first timer, the second timer is first expired. Because the signal characteristic value of the cell using the frequency 2 is satisfied until the second timer expires, the UE stops the first timer and reselects the cell of the frequency 2. The cell of the high priority may be readily reselected by varying the length of the restriction time duration applied to the cell of the high priority. That is, it is sufficient that the restriction time duration of the cell of the high priority is relatively shorter than the cell of the low priority. And, an absolute length of each restriction time duration is not set and may be suitably determined in consideration of the wireless environment and the mobility of the UE.

To maintain backward compatibility with the conventional systems, only the time duration applied to the cell of the high priority may be set to be shorter than the conventional restriction time duration. Alternatively, only the restriction time duration applied to the cell of the low priority may be set to be longer than the conventional restriction time duration.

SUMMARY

The invention seeks to improve the situation.

A first aspect of the invention relates to a handover method for redirecting an ongoing communication of a connected cellular device from a serving cell to a target cell, both cells belonging to a network. The method comprises receiving, in the cellular device, a cell attenuation measurement, a supplemental hysteresis parameter which value depends on the load of the target cell, and a threshold parameter. The method comprises comparing, in the cellular device, and additive combination of the cell attenuation measurement, of a hysteresis parameter and of the supplemental hysteresis parameter with the threshold parameter. The method comprises sending a measurement report from the cellular device to the network if the result of the comparison remains positive during a given duration.

Another aspect of the invention relates to a cellular device set to implement the aforementioned method.

Another aspect of the invention relates to a computer program product implementing the aforementioned method.

BRIEF DESCRIPTION OF THE DRAWINGS

Other aspects and advantages of the invention will become apparent from the following detailed description of specific embodiments of the invention, and the accompanying drawings, in which:

FIG. 4 is a table representing as an example some possible choices for a duration parameter according to certain embodiments of the invention.

DESCRIPTION OF PREFERRED EMBODIMENTS

Figure 1:
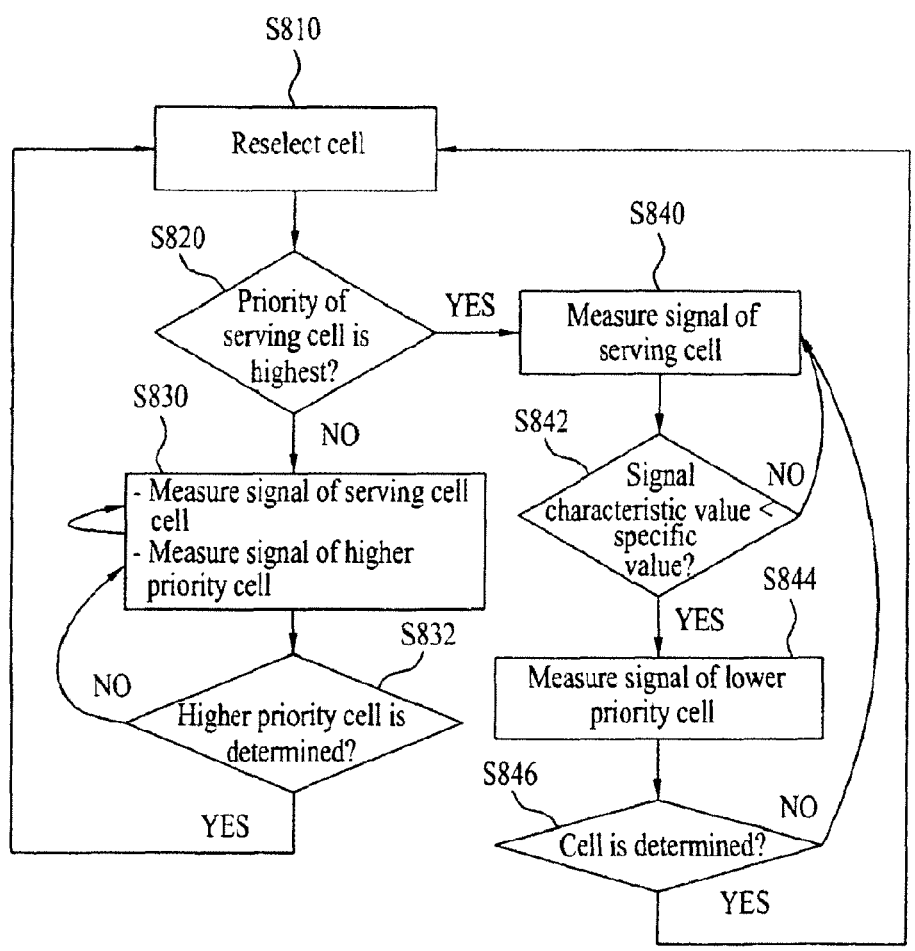
FIG. 1 represents an example of known cell reselection procedure.
Figure 2:
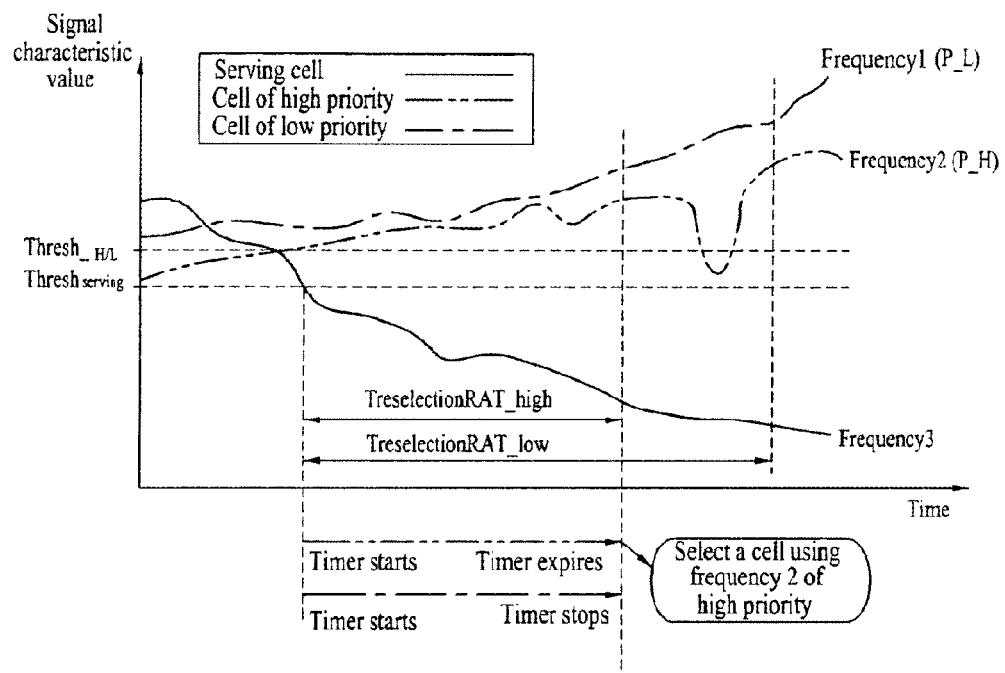
FIG. 2 represents waveforms corresponding to another example of known cell reselection procedure.
Figure 3:
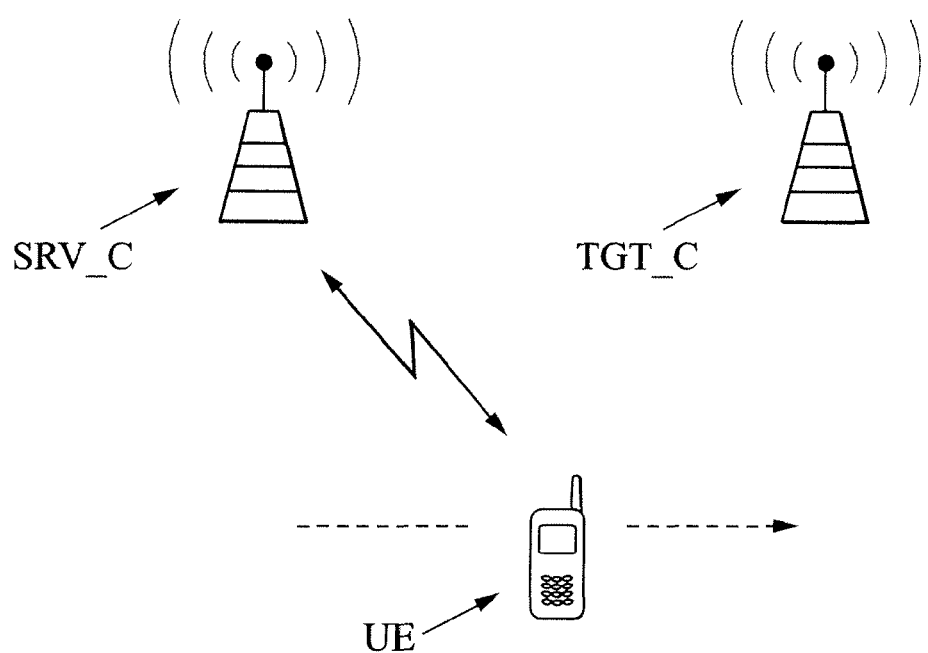
FIG. 3 represents a cellular device according to the invention which is about to handover from a serving cell to a target cell.

Also, while cell reselection takes into account the signal strength of the serving cell and of the target cell, handover decisions are based on the signal strength of the serving cell only.

According to a possible embodiment, a handover method for redirecting an ongoing communication of a connected cellular device UE from a serving cell SRV_C to a target cell TGT_C (both cells belonging to a network) comprises at least five steps /a/, /d/, /c/, and /e/.

In a step /a/, the cellular device UE receives a cell attenuation measurement, such as a parameter Ms not taking into account any offsets, In a step /b/, the cellular device UE receives a supplemental hysteresis parameter which value depends on the load of the target cell TGT_C, such as a parameter HysCellLoad which is typically expressed in decibels (dB).

In a step /c/, the cellular device UE receives a threshold parameter, such as a parameter Thresh, typically expressed in the same unit as the parameter Ms.

In a step /d/, the cellular device UE compares an additive combination of the cell attenuation measurement, of a hysteresis parameter and of the supplemental hysteresis parameter with the threshold parameter. The hysteresis parameter can be a parameter Hys, expressed in dB.

In a step /e/, the cellular device UE sends a measurement report to the network depending on the result of the comparison, if the result of the comparison remains positive during a given duration. The condition for sending the measurement report is cumulative, i.e. the comparison has first to be verified (be positive), and second to be verified constantly during a given duration. The measurement report may comprise the result of the comparison, and/or any or all of the parameters used for the comparison, such as the parameters Ms, Hys, HysCellLoad and Thresh. Such parameters may have changed during the given duration, accordingly it is possible to send, for example, the last values (values at the end of the duration), or the initial values, or average values, or several samples for each parameter (each sample being taken at different points in time). The duration can be measured with a time counter. For example, a time counter can be started as soon as a the result of the comparison is positive (the time counter being reset to zero as soon as the result of the comparison ceases to be positive).

Each attenuation measurement is therefore compared with a threshold which is adjusted according to a hysteresis parameter, and also, importantly, according to a supplemental hysteresis parameter, rather than being compared with (an)other attenuation measurement(s).

This is advantageous as it enables a simpler handover management, by letting the cellular device UE contribute to the handover decision, and it improves the handover by taking into account the load of the target cell(s) TGT_C in a simple fashion. The load of the cell is not only taken into account, but also factored into the supplemental hysteresis parameter. There is no need for a distinct step of checking the load factors in the cellular device UE.

According to a possible embodiment, the cell attenuation measurement may be a serving cell attenuation measurement, the additive combination may be equal to the sum of the serving cell attenuation measurement, of the hysteresis parameter and of the supplemental hysteresis parameter, and the comparison may check whether the additive combination is lower than the threshold parameter. With the above notations, the cellular device UE can therefore check whether Ms+Hys+HysCellLoad<Thresh (there is no practical need for a distinction between strictly lower than and lower than or equal, since equality is statistically not significant). Accordingly, if the result of the comparison is positive, that is if Ms+Hys+HysCellLoad<Thresh, and if it remains positive during a sufficient time, the network would typically seek to trigger a handover from the serving cell SRV_C to another cell to be determined (typically the target cell used in the equation, but if several measurement reports were sent using different equations, it can be another target cell), and otherwise (i.e. if the equation Ms+Hys+HysCellLoad<Thresh is not satisfied or remains true only during an insufficient time) the network would typically let the cellular device stay in the serving cell SRV_C. In most embodiments, the comparison Ms+Hys+HysCellLoad<Thresh determines a leaving condition (i.e. the serving cell is left is the comparison is true during a sufficient duration). However, in some embodiments the comparison Ms+Hys+HysCellLoad<Thresh determines an entering condition. In possible embodiments, there are several target cells, and many measurement reports can be sent, one for each target cell, thereby assisting the network in determining the most appropriate target cell.

According to a possible variant, the cell attenuation measurement is a target cell attenuation measurement, the additive combination is equal to the target cell attenuation measurement minus the hysteresis parameter minus the supplemental hysteresis parameter, and the comparison checks whether the additive combination is greater than the threshold parameter. With the above notations, the cellular device UE can therefore check whether Ms−Hys−HysCellLoad>Thresh (there is no practical need for a distinction between strictly greater than and greater than or equal, since equality is statistically not significant). Accordingly, if the result of the comparison is positive, that is if Ms−Hys−HysCellLoad>Thresh, and if it remains positive during a sufficient time, the network would typically seek to trigger a handover to the target cell TGT_C (or possibly to another target cell, depending on other potential measurement reports), and otherwise (i.e. if the equation Ms−Hys−HysCellLoad>Thresh is not satisfied or remains true only during an insufficient time) the network would typically let the cellular device stay in the serving cell SRV_C. In most embodiments, the comparison Ms−Hys−HysCellLoad>Thresh determines an entering condition (i.e. the target cell TGT_C is entered is the comparison is true during a sufficient duration). However, in some embodiments, the comparison Ms−Hys−HysCellLoad>Thresh determines a leaving condition. In possible embodiments, there are several target cells, and many measurement reports can be sent, one for each target cell, thereby assisting the network in determining the most appropriate target cell.

It is possible to combine the two previous groups of embodiments, i.e. to send measurement reports both for equations of the type Ms−Hys−HysCellLoad>Thresh (for one or more target cell(s)), and for equations of the type Ms+Hys+HysCellLoad<Thresh (for one or more target cell(s)). However, contrary to a cell reselection scenario, an attenuation measurement of a serving cell is never directly compared with an attenuation measurement of a target cell.

Each cell in the system can periodically update its handover thresholds based on its load. When the load of a certain cell is high, a low handover threshold can be set, otherwise a high handover threshold can be set. Accordingly, step /c/ can be repeated at regular and close intervals, in order to be up to date on the latest threshold.

The comparison can be continuous, based on currently available parameters. When the parameters Hys, HysCellLoad and Thresh (or at least a selected subset of parameters) change, it is possible to reset the duration, or alternatively to continue with the current duration measurement as if there had been no change.

In addition, this method works in connected mode, during a communication (for example when a call is on-going, some data transfer is on-going, etc.), and not simply in idle mode. The communication is not merely a control plane communication, but a user plane communication.

In a possible embodiment, the duration parameter used in step /e/ is dependent on the load of the target cell TGT_C. This duration parameter can be equal to a TTT complemented with a new parameter depending on traffic load (TTTCellLoad), in which case the cellular device can add the two parameters TTT and TTTCellLoad to obtain the whole duration (TTTCellLoad being for example a negative or positive adjustment to a default duration value). Alternatively, the TTTCellLoad parameter can represent a whole duration rather than an adjustment. In this case, it is nonetheless possible to use two parameters TTT and TTTCell Load. For example, the actual duration to be used can be the maximum between the TTT, and the supplied TTTCellLoad, or the maximum between a default TTT and the supplied TTTCellLoad. FIG. 4 illustrates possible values for TTTCellLoad according to the traffic load on the cell, where the value TTTCellLoad represents a whole duration (not an adjustment to a TTT).

According to a possible embodiment, the method comprises receiving the supplemental hysteresis parameter inside a measurement control message (MCM).

According to a possible embodiment, the method comprises receiving, in the cellular device UE, the value of the duration in step /e/ inside a measurement control message.

According to a possible embodiment, the method comprises expressing the serving cell attenuation measurement in dBm (power measurement relative to one milliwatt) when it is an RSRP, or in dB when it is an RSRQ (in LTE systems).

According to another embodiment, a cellular device UE comprises a handover module (such as a processor combined with a piece of software executed by the processor) for redirecting an ongoing communication (in the user plane) from a serving cell SRV_C to a target cell TGT_C (both cells belonging to a network), wherein the handover module is set to:

/a/ receive a cell attenuation measurement,

/b/ receive a supplemental hysteresis parameter which value depends on the load of the target cell, /c/ receive a threshold parameter, /d/ compare an additive combination of the cell attenuation measurement, of a hysteresis parameter and of the supplemental hysteresis parameter with the threshold parameter, /e/ send a measurement report to the network depending on the result of the comparison, if the result of the comparison remains positive during a given duration.

According to a possible embodiment of the cellular device UE, the cell attenuation measurement is a serving cell attenuation measurement, the additive combination is equal to the sum of the serving cell attenuation measurement, of the hysteresis parameter and of the supplemental hysteresis parameter, and the comparison checks whether the additive combination is lower than the threshold parameter.

According to a possible embodiment of the cellular device UE, the cell attenuation measurement is a target cell attenuation measurement, the additive combination is equal to the target cell attenuation measurement minus the hysteresis parameter minus the supplemental hysteresis parameter, and the comparison checks whether the additive combination is greater than the threshold parameter.

According to a possible embodiment, the handover module is set to use a duration dependent on the load of the target cell TGT_C for deciding to send the measurement report.

According to a possible embodiment, the handover module is set to receive the supplemental hysteresis parameter inside a measurement control message.

According to a possible embodiment, the handover module is set to receive the value of the duration for deciding to trigger the handover inside a measurement control message.

According to a possible embodiment, the handover module is set to express the serving cell attenuation measurement in dBm when it is an RSRP, or in dB when it is an RSRQ.

The invention also relates to a computer program product comprising one or more stored sequences of instructions that are accessible to a processor and which, when executed by the processor, cause the processor to carry out the steps of handover method according to the invention.

The above embodiments are useful in particular in the context of 3GPP (RAN2, RAN3, CT1 . . . ). It is advantageous to implement them as a part of telecom protocols used in UE stacks for LTE networks for example.

This invention can be applied to the high layers of user equipment and operator network elements.

The above description has been illustrated primarily in an LTE context, however it is applicable to any cellular network technology. The cellular device can of course be a mobile phone, but it could also be any device able to connect to a cellular network, such as a laptop computer equipped with a proper cellular network interface card.

The handover module can be implemented in the form of a piece of software, or it can be a hardware component, or it can work in conjunction with a hardware component. For example, all or part of the method according to the above embodiments could be carried out in a SIM card inserted in a mobile phone.

The variants described with respect to the handover method apply to the cellular device, and vice versa.

The present invention can also be embedded in a computer program product, which comprises all the features enabling the implementation of the methods described herein, and which—when loaded in an information processing system—is able to carry out these methods. Computer program means or computer program in the present context mean any expression, in any language, code or notation, of a set of instructions intended to cause a system having an information processing capability to perform a particular function either directly or after conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A handover method for redirecting an ongoing communication of a connected cellular device from a serving cell to a target cell, both cells belonging to a network, wherein the method comprises:
   (a) receiving, in the cellular device, a cell attenuation measurement,
   (b) receiving, in the cellular device, a supplemental hysteresis parameter which value depends on the load of the target cell,
   (c) receiving, in the cellular device, a threshold parameter,
   (d) comparing, in the cellular device, an additive combination of the cell attenuation measurement, of a hysteresis parameter and of the supplemental hysteresis parameter with the threshold parameter, and
   (e) sending a measurement report from the cellular device to the network when the result of the comparison remains positive during a given duration, wherein for a serving cell attenuation measurement the result remains positive when the additive combination is below the threshold parameter and for a target cell attenuation measurement the result remains positive when the additive combination is above the threshold parameter, wherein when the result does not remain positive during a given duration the cellular device remains in the serving cell,
   wherein the value of the duration in step (e) is dependent on the load of the target cell and a time to trigger (TTT) parameter.

2. The handover method according to claim 1, wherein the cell attenuation measurement is the serving cell attenuation measurement, wherein the additive combination is equal to the sum of the serving cell attenuation measurement, of the hysteresis parameter and of the supplemental hysteresis parameter, and wherein the comparison checks whether the additive combination is lower than the threshold parameter.

3. The handover method according to claim 1, wherein the cell attenuation measurement is the target cell attenuation measurement, wherein the additive combination is equal to the target cell attenuation measurement minus the hysteresis parameter minus the supplemental hysteresis parameter, and wherein the comparison checks whether the additive combination is greater than the threshold parameter.

4. The handover method according to claim 1, wherein the method comprises receiving the supplemental hysteresis parameter inside a measurement control message.

5. The handover method according to claim 1, wherein the method comprises receiving, in the cellular device, the value of the duration in step (e) inside a measurement control message.

6. A cellular device comprising a processor for redirecting an ongoing communication from a serving cell to a target cell, both cells belonging to a network, wherein the processor is set to:
   (a) receive a cell attenuation measurement,
   (b) receive a supplemental hysteresis parameter which value depends on the load of the target cell,
   (c) receive a threshold parameter,
   (d) compare an additive combination of the cell attenuation measurement, of a hysteresis parameter and of the supplemental hysteresis parameter with the threshold parameter, and
   (e) send a measurement report to the network when the result of the comparison remains positive during a given duration, wherein for a serving cell attenuation measurement the result remains positive when the additive combination is below the threshold parameter and for a target cell attenuation measurement the result remains positive when the additive combination is above the threshold parameter, wherein when the result does not remain positive during a given duration the cellular device remains in the serving cell,
   wherein the value of the duration in step (e) is dependent on the load of the target cell and a time to trigger (TTT) parameter.

7. The cellular device according to claim 6, wherein the cell attenuation measurement is the serving cell attenuation measurement, wherein the additive combination is equal to the sum of the serving cell attenuation measurement, of the hysteresis parameter and of the supplemental hysteresis parameter, and wherein the comparison checks whether the additive combination is lower than the threshold parameter.

8. The cellular device according to claim 6, wherein the cell attenuation measurement is the target cell attenuation measurement, wherein the additive combination is equal to the target cell attenuation measurement minus the hysteresis parameter minus the supplemental hysteresis parameter, and wherein the comparison checks whether the additive combination is greater than the threshold parameter.

9. The cellular device according to claim 6, wherein the handover module is set to receive the supplemental hysteresis parameter inside a measurement control message.

10. The cellular device according to claim 6, wherein the handover module is set to receive the value of the duration for deciding to trigger the handover inside a measurement control message.

11. A non-transitory computer readable medium comprising one or more stored sequences of instructions that are accessible to a processor and which, when executed by the processor, cause the processor to carry out the steps of claim 1.

* * * * *